United States Patent [19]
Ainoura

[11] 3,708,925
[45] Jan. 9, 1973

[54] SCREW-SHAPED GEAR HONE AND METHOD OF FORMING AND USING THE SAME

[75] Inventor: Masato Ainoura, Kitashigeyasu-machi, Japan

[73] Assignees: Tsukihoshi Gomu Kabushiki Kaisha, Kurume-shi; Kabushiki Kaisha Kashifuji Tekkosho, Kyoto-shi, Japan

[22] Filed: Sept. 24, 1970

[21] Appl. No.: 74,973

[30] Foreign Application Priority Data

Sept. 30, 1969 Japan ........................... 44/78361

[52] U.S. Cl. ............................... 51/206 P, 51/287
[51] Int. Cl. ........................... B24d 5/02, B24b 19/00
[58] Field of Search ......... 51/206 R, 206 P, 394, 395, 51/287, 298, 299, 328

[56] References Cited

UNITED STATES PATENTS

| 1,708,570 | 4/1929 | Hanson | 51/287 X |
| 1,759,333 | 5/1930 | Wildhaber | 51/287 X |
| 2,942,389 | 6/1960 | Praeg | 51/287 |
| 2,913,858 | 11/1959 | Praeg | 51/206 R |
| 3,085,369 | 4/1963 | Findley | 51/287 X |
| 2,603,045 | 7/1952 | McDougal | 51/206 P UX |

Primary Examiner—Donald G. Kelly
Attorney—McGlew and Toren

[57] ABSTRACT

A worm-shape or screw-shape hone, for honing gear teeth, has the tooth profile of the basic rack at its normal plane. The hone is formed by molding synthetic polymers in which there are dispersed abrasive particles, to provide a Shore hardness of 15° – 75° and a Young's modulus $0.5 - 70 \times 10^3$ kg/cm². The hone is engaged with the gear to be finished and is rotated by a motor with the hone driving the gear. During honing of the gear, the hone is fed parallel to the axis or tooth trace of the gear over the whole face width of the gear. The polymer material may comprise a co-cured blend of polyurethane rubber and epoxy resin having a suitable flexibility, good resiliency and high abrasion resistance, and the abrasive particles may comprise Alundum or Carborundum, the abrasive particles being exposed at the working surface of the hone.

3 Claims, 15 Drawing Figures

INVENTOR
Masato Ainoura by McGlew & Toren
ATTORNEYS

SCREW-SHAPED GEAR HONE AND METHOD OF FORMING AND USING THE SAME

BACKGROUND OF THE INVENTION

In prior gear finishing methods, such as lapping or gear honing, the gear has been finished with a tool in the form of a helical gear, whose tooth profile is involute and conjugate with the desired tooth profile of the gear to be finished.

In lapping, a gear to be finished usually is meshed with a lapping tool of a suitable cast iron, and the gear is rotated by the lapping tool and, at the same time, a compound containing a suitable abrasive for lapping is poured into the meshing parts of the gear and the lapping tool to cut away the slightly projecting parts of the tooth profile of the gear to be finished. However, the life of the lapping tool is short, because a good deal of wear occurs on the tooth surface of the cast iron lapping tool. Furthermore, it is difficult to obtain the precise tooth profile by this finishing method, as the initial tooth profile of the lapping tool is destroyed by the initial abrasion.

A gear honing method, which is an improvement on a known gear shaving method using gear shaving cutters, has been proposed In Japanese Pat. No. 8697/1960. In this method, a rigid honing tool, in the form of a helical gear, is used, and the honing tool is formed of plastics or synthetic resins compounded with abrasive particles to have a hardness, as measured on the Rockwell M scale between 90 points above zero and 40 points below zero. The honing tool is formed precisely to the tooth shape conjugate with the desired tooth profile of the gear to be finished, as shown in FIG. 5 A of the drawings. The honing tool is utilized to remove nicks and burrs on the tooth surfaces of the gear to be finished, and to modify slightly the tooth profile. However, this gear-shaped honing tool is expensive, as a high degree of technique is necessary to produce the same in accurate form. Furthermore, the honing process is not efficient, as it utilizes only the sliding motion, of the rolling and sliding motions which occur during rotation of the gear to be finished meshing with the gear-shaped hone, and this sliding motion is small as compared with the peripheral speed of the gear.

As another method of finishing a gear, it has been proposed to grind the gear by a grinding wheel in the form of a screw. In this case, the screw-shaped rigid grinding wheel is meshed with the gear to be finished, and both are rotated at a precisely correct speed by additional gearing. Either the grinding wheel or the gear to be finished is fed parallel to the axis of the gear to be finished, so that the gear teeth are ground by the grinding wheel. Consequently, the axles of the grinding wheel and of the gear to be finished must be connected by complicated and very precise gearing, and the grinding wheel has to be formed to a very high precision. The tooth form of the screw-shaped grinding wheel must be trued by a large diamond very often, and such truing takes a long time. Consequently, the grinding machine is very complicated and very expensive. As the grinding wheel should rotate at high speed, it cannot be used for gears having a pitch larger than module 7 with respect to the dynamic balance of the grinding wheel.

SUMMARY OF THE INVENTION

This invention relates to gear honing and, more particularly, to a novel and improved worm-shape or screw-shape gear hone, a method of forming the gear hone.

The present invention obviates the above-mentioned disadvantages, and is directed to a honing tool in the form of a screw and having the tooth profile of the basic rack at its normal plane. The honing tool is formed by compounding synthetic polymers, such as a co-cured blend of polyurethane rubber and epoxy resin having a suitable flexibility, good resiliency and high abrasion resistance. Abrasive particles, such as Alundum or Carborundum are dispersed in the honing tool, and the compound is molded so as to expose the abrasive particles on the working surface thereof.

This worm-shape or screw-shape hone is engaged with the gear to be finished and is rotated by a motor, with the gear to be finished being driven by the hone. In the invention method of honing a gear, appropriate tooth bearing is obtained on each tooth surface between the hone and the gear to be finished, and the hone is fed parallel to the axis or tooth trace of the gear to be finished over the whole face width of the gear. As a result, the hone cuts away the slightly projected parts from the correct tooth profile of the gear to be finished, and corrects the roughness as well as improves the tooth profile, the pitch accuracy, and the accuracy of the tooth trace, rapidly and easily, to provide a durable and noiseless gear.

An object of the invention is to super finish, efficiently and simply, the tooth surfaces of hardened gears, hard gears cut after heat treatment, shaved gears and ground gears.

Another object of the invention is to increase the surface strength and life of the gear.

A further object of the invention is to produce a gear for high speed and high load, and which is noiseless in operation.

Another object of the invention is to provide such a gear for high speed and high load noiseless operation by decreasing the single pitch error, the pitch variation and the cumulative pitch error of the gear.

For an understanding of the principles of the invention, reference is made to the following description of typical embodiments thereof as illustrated in the accompanying drawings.

BRIEF DESCRIPTION OF THE DRAWINGS

In the drawings:

FIG. 11 B is an enlarged sectional view showing the tooth profile error of a gear honed by the method of the present invention;

FIG. 12 B is a graphic illustration of the same errors of a gear after honing by the method of the present invention.

DESCRIPTION OF THE PREFERRED EMBODIMENTS

Figure 1:
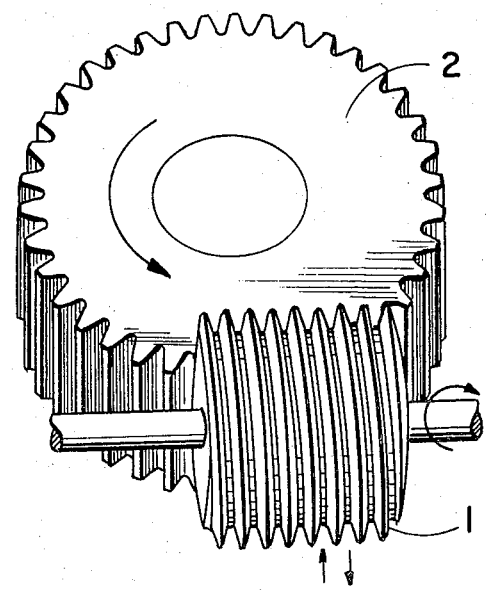
FIG. 1 is a front elevation view showing the relative positions and relative movements of a gear to be finished and a worm-shape or screw-shape gear finishing hone.
Figure 2:
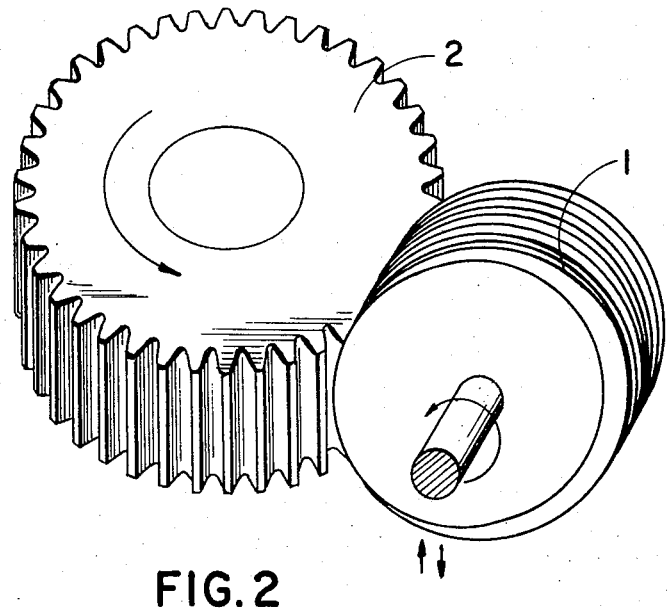
FIG. 2 is a side elevation view corresponding to FIG. 1.

Referring to the drawings, FIGS. 1 and 2 illustrate a worm-shape or screw-shape hone 1, embodying the present invention, as used to hone a gear 2 to be finished. As indicated by the arrows, hone 1 is moved parallel to the axis of gear 2, while being rotated, by a suitable motor, in meshing engagement with gear 2 to rotate gear 2.

Figure 3:
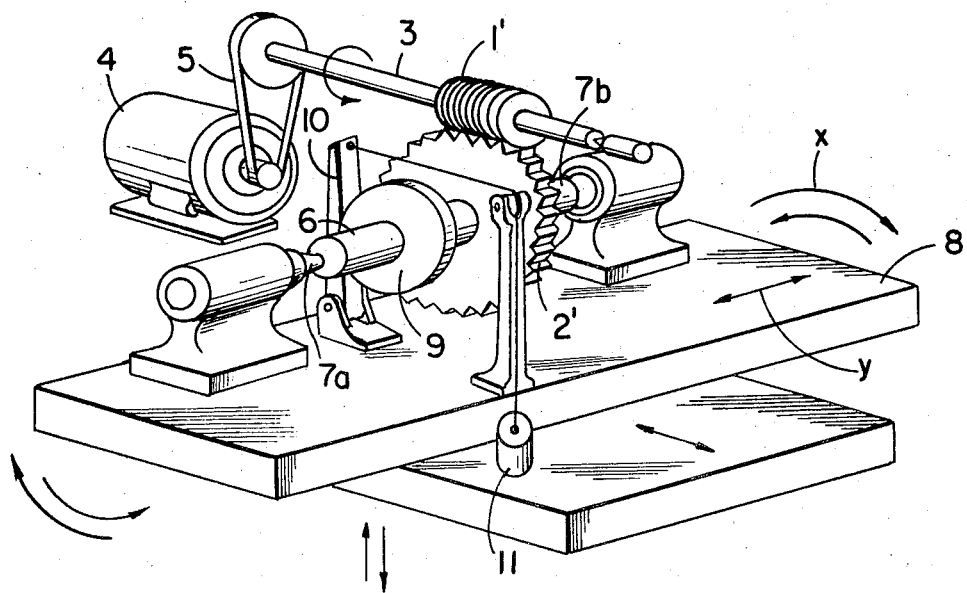
FIG. 3 is a perspective view of apparatus for honing a gear in accordance with the present invention.

FIG. 3 illustrates apparatus for finishing small spur gears and helical gears in accordance with the present invention. Axle 3 of screw-shape or worm-shape hone 1' is rotated, through a speed change gear 5, by a motor 4. The gear 2' to be finished is mounted on an arbor 6 rotatably supported between centers 7a and 7b on a table 8. Arbor 6 has a brake drum 9 secured thereto and cooperable with braking means including a brake shoe 10 and a weight 11.

Table 8 is angularly adjustable in the directions indicated by arrows $x$ to adjust the direction of the screw thread of hone 1' relative to the tooth trace of gear 2'. After hone 1' is engaged with gear 2', hone 1' is rotated by the motor to rotate gear 2', with the braking device being effective.

At the same time, table 8 is fed in the directions indicated by arrows $y$ by another driving gear, which has not been shown, and thus gear 2' is fed, parallel to its axis, to the hone 1'. Engagement between the screw-shape or worm-shape hone 1' and gear 2' is adjusted by vertical movement of either the hone axis or the table, to change the center distance between the hone axis and the gear axis, and is adjusted so that there is some backlash during the honing operation. Axle 3 of hone 1' may be rotated in either direction by motor 4, in accordance with whether the hone is finishing the right tooth surfaces or the left tooth surfaces of gear 2'.

Figure 4:
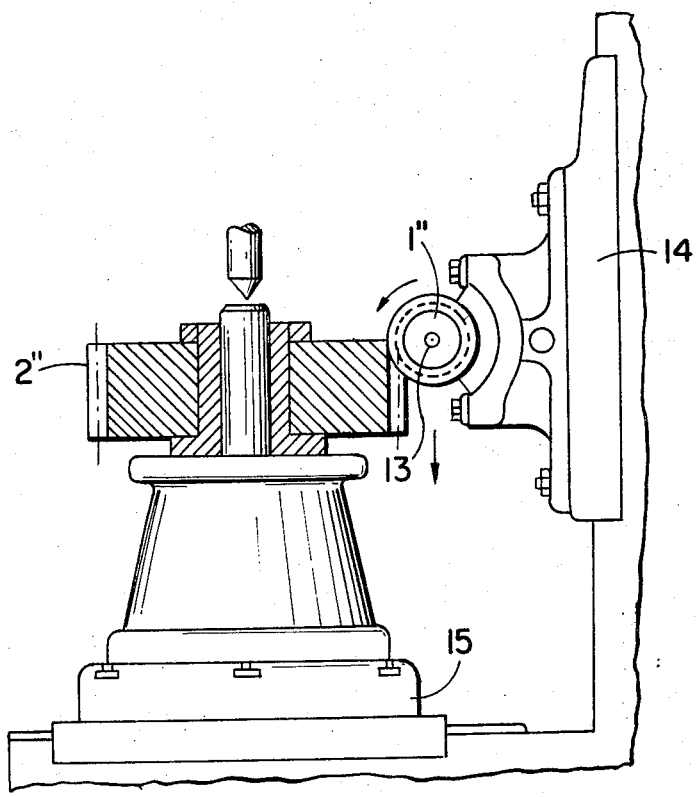
FIG. 4 is a side elevation view, partly in section, illustrating another embodiment of the invention method.

FIG. 4 illustrates a universal gear hobbing machine as used to finish a large diameter gear in accordance with the invention. A screw-shape or worm-shape hone 1'' is secured to the axle 13 of the hob, and the axle is driven by an independent motor which has not been shown in the drawing. Hob axle 13 is inclined, as in the case of gear hobbing, and the direction of the screw thread of hone 1'' and that of the tooth trace of the gear 2'', to be finished, are made to coincide. Hob saddle 14 is fed upwardly and downwardly, at a suitable speed, by another independent driving mechanism, which has not been shown in the drawing. Table 15 need not be angularly displaced, and, in the illustrated arrangement, it is only necessary that gear 2'', mounted on table 15, can be rotated freely. Hob axle 13 is rotated in opposite directions in accordance with whether the right of the left tooth surface of the gear 2'' are being finished. Alternatively, both surfaces can be finished simultaneously by firmly inserting the tooth of hone 1'', in which the tooth height is lower than that of the gear, between the tooth surfaces of gear 2''.

The objectives of the present invention cannot be attained unless the material of the screw-shape or worm-shape hone has a sufficient resiliency and flexibility to fit the tooth surfaces of the gear to be finished, does not decrease the sharpness, and has a sufficient abrasion resistance while not producing clogging of the grinder. In the prior art, the materials for a gear hone have been selected from hard plastics, such as epoxy resins, amino resins, phenol resins, etc., or the cured and molded hard plastics just mentioned have been compounded with fibers to increase the tensile strength. As a hone made from these materials is a rigid body having poor flexibility, it is necessary that it be finished very precisely to a shape having a tooth profile conjugate with the desired finished-profile of the gear to be honed. However, such forming of the hone is very expensive.

The characteristics of a hone for performing the method of the present invention have been tested, and it has been found that binders for the abrasives should be adopted from polymeric materials which have a Shore D hardness of 15° – 75°, a Young's modulus 0.5 – 70×10³ kg/cm², high adhesion to the abrasive particles and resistance to the cutting oil usually used in the honing operation.

As a material having these necessary characteristics, a blend of 90 – 20 percent of liquid polyurethane rubber prepolymer and 10 – 80 percent of epoxy resin co-cured with suitable amines is preferred, but any material can be used provided that the physical properties of the completed hone satisfy the above-mentioned conditions.

The use of polyurethane rubbers as the principal material for the hone is for the purpose of improving the abrasion resistance of the screw-shape hone to prevent deformation of the tooth profile, and for improving the accuracy of the finished gears by the resilient fit of the tooth of the hone to the tooth surfaces of the gear during the honing operation. However, a hone formed only of polyurethane rubber is too soft to hone sufficiently, especially in the case of quenched gears of high hardness. Consequently, in accordance with the present invention, the ratio of the epoxy resin compounded with the polyurethane rubber is adjusted in accordance with the purpose for which the hone is to be used. For example, the ratio of polyurethane rubber is increased for finishing gears of soft materials, such as bronze.

The other reasons why polyurethane rubber is used as the principal material of the screw-shape or worm-shape hone of the invention may be stated as follows:

1. Polyurethane rubber prepolymer, before the curing reaction, is liquid, and can be mixed easily with abrasive particles and with liquid epoxy resin, the latter being supplied for adjusting the hardness of the composition.

2. The mixed composition is convenient for casting into a mold.

3. Polyurethane rubber prepolymer and epoxy resin can be co-cured by a single curing agent, of the amine or acid anhydride series, and furthermore the properties of the co-cured blend are good.

4. Polyurethane rubber has a high Young's module when its deformation speed is rapid, so as to exhibit the same properties as a rubber of higher hardness. Therefore, if the apparatus of the invention is constructed with a screw-shape or worm-shape hone having a variable speed of rotation, one hone can act as both a soft and hard hone over a wide range, and several kinds of gears, having different hardnesses after quenching, can be honed under the best conditions by a single screw-shape hone. This possibility, of changing the hardness of the hone by changing the rotation speed thereof, is a characteristic of the present invention which is completely unknown with respect to prior hones of the same type.

Figure 9:
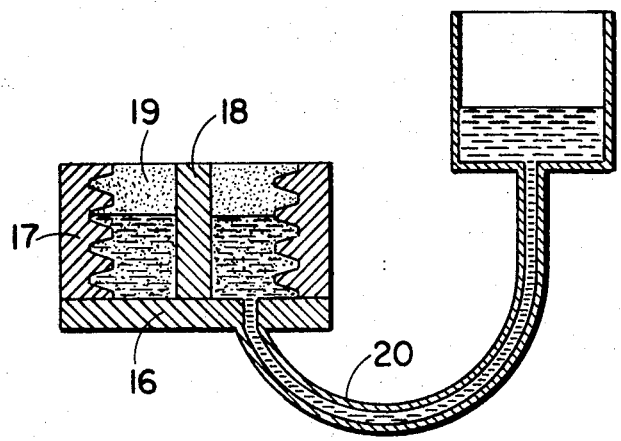
FIGS. 9 and 10 are vertical sectional views illustrating the method of producing a worm-shape or screw-shape hone in accordance with the present invention.

These points are emphasized by the examples of compositions for the hone, as set forth in the following table:

uniform products. Referring to FIG. 9, abrasive particles are placed in the cavity 19 of a mold comprising a base 16, an outer mold part 17 and a center mold part 18, and the upper surface of the particle layer is leveled. A reservoir 20 communicates with the bottom of cavity 19 and is filled with the liquid polymer composition. The liquid surface is gradually leveled up from the under part of the particles to the upper surface of the particle layer, and the mass is heated, with the mold, to set the polymer blend.

Figure 10:
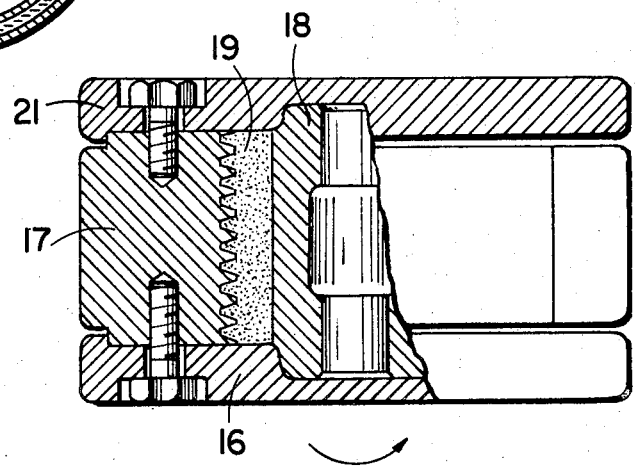

With some conditions of particle size or shape of the abrasive particles, viscosity of polymer blends, etc., a procedure as shown in FIG. 10 is adopted. Abrasive particles are completely mixed with the liquid polymer blend, casted into the cavity 19 of a mold, the cover 21 is set, and the blend is heated to cure, with the mold being rotated by a suitable means for preventing sedimentation of the abrasive particles.

When the ratio of the polyurethane rubber used is too great and adhesion between the abrasive particles and the polymer blend is insufficient, the surface of the abrasive particles are previously coated with epoxy resin, very thinly, to improve the adhesion.

Honing tests with 10 species of screw-shape or worm-shape hones, molded as above mentioned, were made with the apparatus shown in FIG. 3, and the results are shown in the last line of the preceding table.

RECEIPES FOR AND PROPERTIES OF HONES

| Test number | 1 | 2 | 3 | 4 | 5 | 6 | 7 | 8 | 9 | 10 |
|---|---|---|---|---|---|---|---|---|---|---|
| Receipe: | | | | | | | | | | |
| Polyether-polyurethane prepolymer | 100 | 90 | 60 | 50 | 25 | 0 | 90 | 60 | 50 | 25 |
| Epoxy resin | 0 | 10 | 40 | 50 | 75 | 100 | 10 | 40 | 50 | 72 |
| Curing agent of amine series | 11 | 13.8 | 22.2 | 25 | 32 | 45 | 13.8 | 22.2 | 25 | 32 |
| Plasticizer | 0 | 0 | 0 | 0 | 0 | 10 | 0 | 0 | 0 | 0 |
| Abrasive grains WA #320 | 214 | 218 | 226 | 228 | 234 | 248 | 0 | 0 | 0 | 0 |
| Abrasive grains WA #120 | 0 | 0 | 0 | 0 | 0 | 0 | 269 | 278 | 282 | 289 |
| Volume percent of abrasive grains | 35 | 35 | 35 | 35 | 35 | 35 | 40 | 40 | 40 | 40 |
| Properties after curing: | | | | | | | | | | |
| Tensile strength (kg./cm.²) | 215 | 186 | 395 | 561 | 675 | 860 | 149 | 307 | 433 | 520 |
| Elongation (percent) | 120 | 90 | 12.5 | 2.5 | ≈0 | ≈0 | 25 | 7.5 | 2.5 | ≈0 |
| Shore D hardness | 22 | 26.5 | 36.0 | 42.5 | 60.0 | 82.5 | 24.0 | 34.0 | 39.0 | 46.5 |
| Young's modulus (10³ kg./cm.²) | 0.32 | 0.65 | 4.65 | 30.4 | 58.9 | 76.7 | 1.03 | 7.74 | 73.8 | 63 |
| Yielding point (kg./cm.²) | | | 1,150 | 1,270 | 1,615 | 1,920 | | 780 | 869 | 1,500 |
| Impact strength (IZOD kg.-cm./cm.²) | >30 | >30 | 6.22 | 4.53 | 2.28 | 1.31 | >30 | 4.72 | 2.99 | 2.36 |
| Result of honing test: | | | | | | | | | | |
| State of finished surface | Bad | Good | Good | Good | Good | Bad | Good | Good | Good | Good |

In the foregoing table, the curing agent is 4, 4' - methylene bis-(2-chloroaniline), the plasticizer is dioctyl phthalate, and the epoxy resin is Epikote 828, which is a liquid epoxy resin produced by Shell Oil Company and a condensate of epichlorohydrin and bisphenol A. The abrasive particles are white Alundum, and the associated numbers indicate the mesh size of the particles.

The compositions mentioned in the table are prepared and molded and cured with heat to provide screw-shape or worm-shape hones. When the abrasive particles are added into the liquid polymer blends and the mold is filled, if the liquid polymer blends are in too small amount as compared to the abrasive particles, the molded products have voids in the interior and reduced strength. On the other hand, if the liquid polymer blends are too great in quantity, as compared to the abrasive particles, the abrasive particles form sedimentation to produce non-uniform products. Consequently, in the present invention, special procedures, as shown in FIGS. 9 and 10, are adopted to produce The details of one example are as follows:

Item of the tested screw-shaped hone
- normal module: 3
- pitch circle diameter: 100 mm
- outer diameter: 107.2 mm
- axial pitch: 9.43 mm
- pressure angle: 20°
- lead angle: 1°43'
- kind of screw: right-hand single thread worm
- composition of hone: No. 4 of Table 1

Item of the worked gear
- number of teeth: 24
- pitch circle diameter: 78 mm
- pressure angle: 20°
- face width: 50 mm
- material: SMCM 9*
- Brinel hardness after quenching: 380

*SNCM 9 is a nickel-chromium-molybdenum steel in accordance with Japanese industrial Standards of 1965, and the chemical composition is as follows:
C 0.44 – 0.5%, Si 0.15 – 0.35%, Mn 0.60 – 0.90%, P less than 0.030%, S less than 0.030%, Ni 1.60 – 2.00%, Cr 0.60 – 1.00%, Mo 0.15 – 0.30%.

In tests under the above-mentioned conditions, the honing required only about 40 seconds for the tooth surface of the gear to be finished to have a mirror-like finish.

Figure 11A:
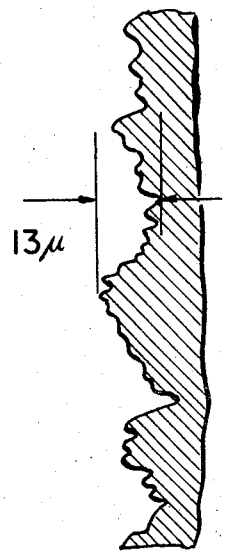
FIG. 11 A is an enlarged sectional view showing the tooth profile error of the tooth surface after gear cutting and before finishing.
Figure 11B:
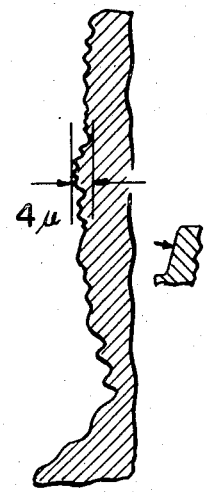

As stated, FIG. 11A shows a degree of roughness of the tooth profile immediately after gear cutting, while FIG. 11B shows the same tooth profile after honing in accordance with the method of the present invention. Both of these figures are greatly enlarged partial sections.

Figure 12A:
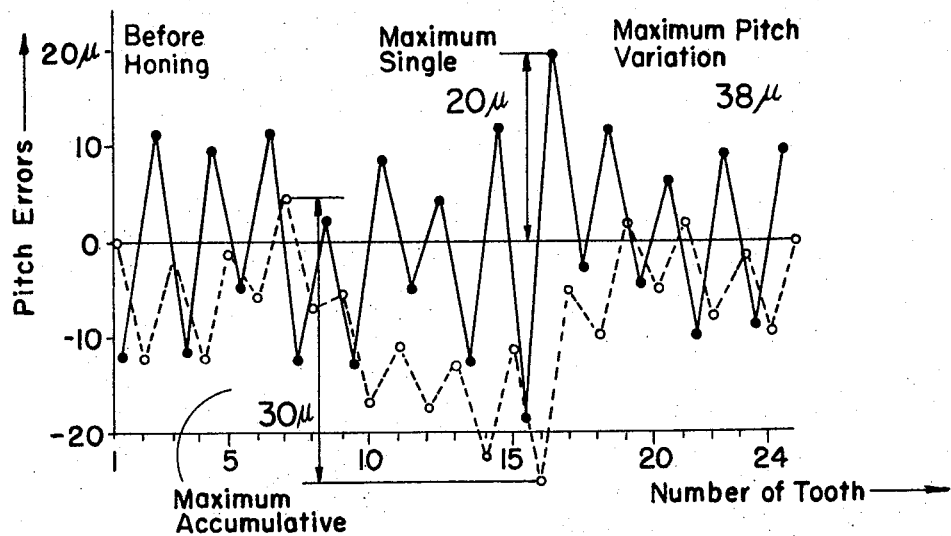
FIG. 12 A is a graphic illustration of the maximum cumulative pitch error, the maximum single pitch error and the maximum pitch variation of a gear after cutting but before honing.
Figure 12B:
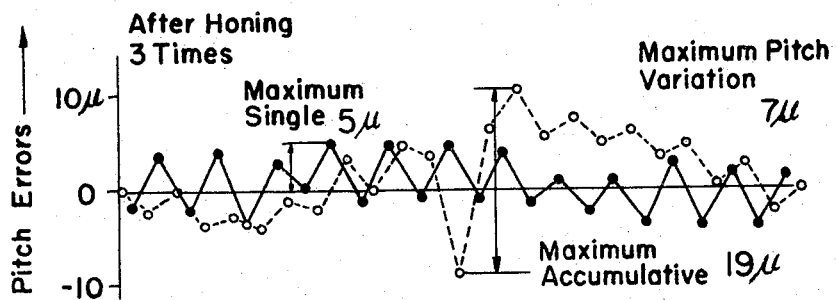

The pitch errors of the gear are measured and shown in FIGS. 12A and 12B, with FIG. 12A illustrating the pitch errors before honing and FIG. 12B illustrating the pitch errors after honing. The pitch errors become very small after honing, and also the roughness of the tooth surface is greatly minimized. The values are as follows:

|  | Before honing (micron) | After honing (micron) |
|---|---|---|
| Tooth profile error | 13 | 4 |
| Tooth trace error | 6 | 3 |
| Maximum accumulative pitch error | 35 | 7 |
| Maximum single pitch error | 24 | 10 |
| Maximum pitch variation | 35 | 7 |

The honing results with the screw-shape or worm-shape hones produced by the 10 compositions shown in Table 1 have been tested. With the hone having composition (6), i. e., epoxy resin only, the gear is finished to have a very nice appearance, but is cut a good deal near the pitch points, with the addendum and the dedendum being cut a slight amount.

With a hone formed from composition (1), i.e., from polyurethane rubber only, the gear is not readily cut but is only glazed, as by buffing, and no effect can be attained even by changing the ratio of abrasive particles or by increasing the angular velocity of the screw-shape or worm-shape hone. With hones having any of the other 8 compositions suggested in the table, satisfactory results are obtained.

Figure 5A:
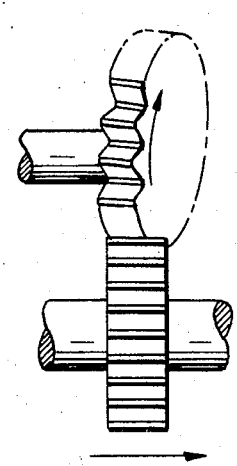
FIGS. 5 A and 5 B are explanatory views illustrating a method of honing gear teeth using a known gear honing tool in the form of a gear.
Figure 5B:
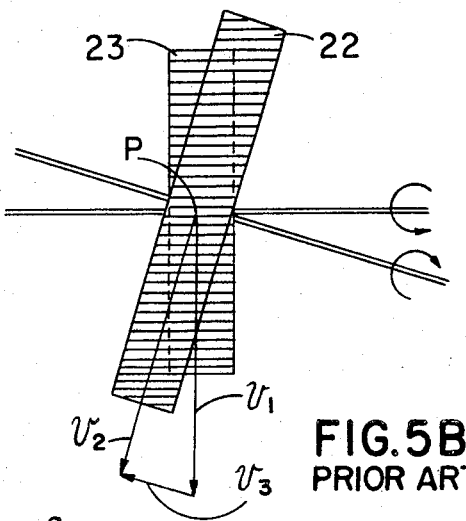

The method of the present invention can be compared with a prior art honing method using a helical gear, by reference to FIGS. 5A and 5B. FIG. 5B shows how hone 22, in the form of a helical gear, is engaged with the gear 23 to be finished, in accordance with prior art practice, and FIG. 5A is an external view. At the engaged pitch point P, the surface velocity of gear 23 in a tangential direction is $v_1$, and that of the hone is $v_2$. Therefore, a slide of $v_3$ is caused between the engaged tooth surfaces. The sum of this slide and the involute slide, which is zero at the engaged pitch point P and which is larger at the addendum and the dedendum, is the base for the abrasive particles of the hone to cut the tooth surface. However, the speed and magnitude of this slide is small as compared with the peripheral speed of the gear.

Figure 6:
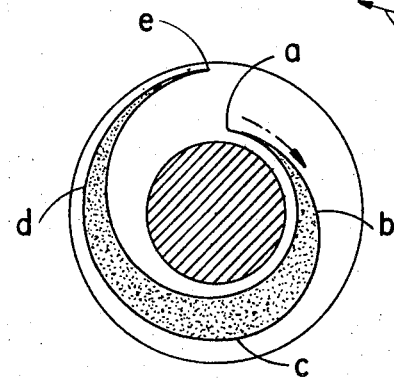
FIG. 6 is a sectional view illustrating the working relation of the invention hone to the gear to be finished.
Figure 7:
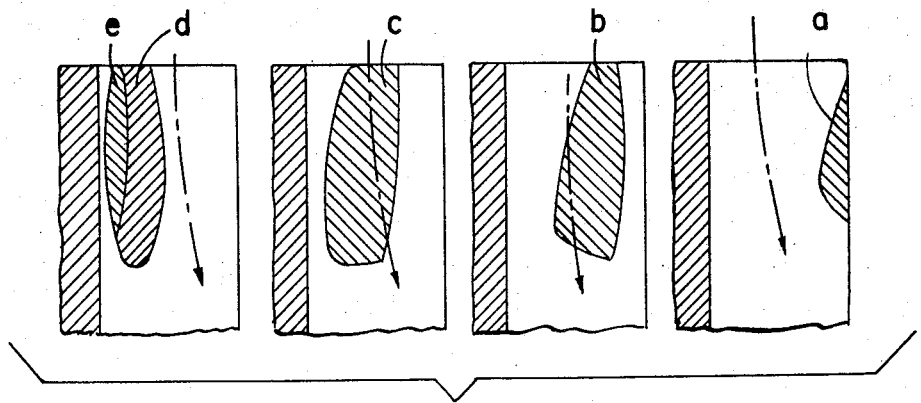
FIG. 7 is a sectional view illustrating the gear to be finished as being finished by the screw-shape or worm-shape hone of the invention.

FIG. 6 illustrates an example of the cutting action caused by contact of the tooth surface of a screw-shape hone after it is engaged with the gear to be finished, and with the two elements being engaged in the order of $a$, $b$, $c$, $d$, $e$. FIG. 7 illustrates the honed surfaces resulting from contact of the tooth surface of the gear to be finished, at each moment, at the positions $a$, $b$, $c$, $d$, $e$.

The screw-shape or worm-shape hone of the invention bends elastically, and the area of metal removal by contact becomes greater by increasing the contact pressure. At each moment during the engagement, the abrasive particles in the hone slide in the directions of the arrows shown in dot and dash line with respect to each of the honed areas. Thus, the mechanism of cutting by abrasive particles with the screw-shape or worm-shape hone of the present invention is completely different from that of honing using a helical gear type hone.

The engagement between a helical gear type hone and the gear to be finished is composed of rolling contact and sliding contact, and the speed and magnitude of the slide are small as compared to the peripheral speed. On the contrary, the contact between a screw-shape hone and the gear to be finished is solely a sliding contact, with the peripheral speed of the screw-shape hone being the same as the sliding speed. Furthermore, the sliding speed and magnitude are greater by far than in the prior method, and thus the cutting efficiency is very high and the freedom of electing the working conditions is increased. Also, the means for mounting the gear to be finished is simple, as the rotation speed of the gear is small compared with that of apparatus used in prior art methods.

Additionally, as at least two or three turns of the thread of the screw-shape hone always contact with an equal number of teeth of the gear to be finished, the contacting pressure is concentrated only on the projections of the tooth surface, and the cutting quantity is greatest at these parts, thereby increasing the pitch accuracy a great deal.

Figure 8:
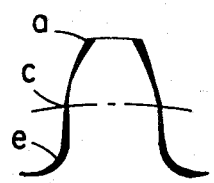
FIG. 8 is a part elevation and part sectional view illustrating the tooth profile of a gear as finished by the method of the present invention.

Another characteristic of the present invention is that the area of tooth contact surface of the screw-shape hone is as shown in FIG. 6, and the number of working abrasive particles is high near the pitch point $c$ and small at the addendum $a$ and the dedendum $e$. Also, the contact pressure is high at the points, so that the addendum and dedendum are honed substantially, as shown in FIG. 8. Thus, crowning can be modified along the tooth profile by establishing suitable working conditions. The screw-shape hone of the present invention is also elastic, and the dedendum is more rigid than the addendum. Therefore, the addendum of the gear tends to be cut more than does the dedendum thereof. Especially, as in quenched gears the tooth surface at the addendum tends to swell due to the strain from quenching, this tendency of cutting the addendum more than the dedendum is very effective.

Another characteristic of the present invention is that the gear can be finished with the screw-shape hone by changing the center distance of the hone and the gear a very small amount at a suitable time. As an example of the method, the screw-shape hone is constructed with a double eccentric axle which can rotate and revolve at the same time, and the center of the screw-shape hone and the center of the gear approach and separate only a very small distance.

As another advantage, a support for the gear to be finished and the center of the hone can be moved nearer together and moved further apart by small amounts periodically with rotation of the hone, using a cam mechanism. By so doing, the abrasive particles work even more efficiently, the tendency of clogging or vitrification is obviated, and the honing is efficiently effected. These procedures could not be used in the prior art gear finishing methods, and the present invention is especially efficient when it is intended to scrape off the high points and irregularities on the teeth of the gear to be finished, especially the high points of undulations at high speed.

As compared with helical gear honing, of the prior art, in the present invention the elastic screw-shape or worm-shape hone can be produced easily and cheaply, and has a high honing efficiency. The gear can be finished in a very short time and using very simple apparatus, to diminish the roughness of the tooth surface, tooth profile errors and pitch errors, and to improve the accuracy of the tooth thread, etc.

While specific embodiments of the invention have been shown and described to illustrate the application of the principles of the invention, it will be understood that the invention may be embodied otherwise without departing from such principles.

WHAT IS CLAIMED IS:

1. A resilient worm-shape hone, for honing gear teeth by meshing engagement with the gear teeth while being rotated to serve as the only driving means for a rotatable gear having the teeth to be honed, said hone having a worm profile corresponding to the gear teeth profile, and comprising abrasive particles dispersed in a molded resilient polymer material having a Shore hardness of $15° - 75°$ and a Young's modulus of $0.5 - 70 \times 10^3$ kg/cm².

2. A worm-shape hone, as claimed in claim 1, in which said polymer material is a cured compound of polyurethane rubber and epoxy resin.

3. A worm-shape hone, as claimed in claim 1, in which said polymer material is a cured compound of 90 – 20 percent of polyurethane rubber and 10 – 80 percent epoxy resin.

* * * * *